United States Patent [19]

Koseki et al.

[11] Patent Number: 4,669,520
[45] Date of Patent: Jun. 2, 1987

[54] HEAVY DUTY PNEUMATIC RADIAL TIRES

[75] Inventors: Hiroyuki Koseki, Kodaira; Jun Watanabe, Suginami; Nanako Takano, Tokorozawa, all of Japan

[73] Assignee: Bridgestone Corporation, Tokyo, Japan

[21] Appl. No.: 768,087

[22] Filed: Aug. 21, 1985

[30] Foreign Application Priority Data

Aug. 24, 1984 [JP] Japan ................... 59-175222

[51] Int. Cl.$^4$ ............................. B60C 9/20
[52] U.S. Cl. ................. 152/527; 152/535; 152/538
[58] Field of Search ........... 152/526, 527, 535, 536, 152/537, 538

[56] References Cited

U.S. PATENT DOCUMENTS

| | | | |
|---|---|---|---|
| 2,958,359 | 2/1958 | Boussu et al. | 152/535 |
| 3,195,604 | 7/1965 | Boussu et al. | 152/535 |
| 3,224,481 | 12/1965 | Lugli | 152/535 |
| 3,789,898 | 2/1974 | Montagne | 152/535 |
| 4,271,890 | 6/1981 | Pommier | 152/535 |

FOREIGN PATENT DOCUMENTS

| | | | |
|---|---|---|---|
| 1309356 | 10/1962 | France | 152/526 |
| 2017019 | 9/1979 | United Kingdom | 152/531 |

*Primary Examiner*—Donald E. Czaja
*Assistant Examiner*—Ramon R. Hoch
*Attorney, Agent, or Firm*—Sughrue, Mion, Zinn, Macpeak, and Seas

[57] ABSTRACT

A heavy duty pneumatic radial tire having an improved service durability is disclosed, which comprises a radial carcass and a belt composed of at least three belt layers. In this tire, the belt has a so-called middle removed structure, wherein a pair of first belt layer portions are arranged at both sides of the belt near the carcass across the mid-circumference of the tire, and further a pair of insert cord plies having a particular tensile modulus per unit width are interposed between the first and second belt layers.

9 Claims, 9 Drawing Figures

HEAVY DUTY PNEUMATIC RADIAL TIRES

BACKGROUND OF THE INVENTION

Field of the Invention and Related Art Statement:

This invention relates to heavy duty pneumatic radial tires, and more particularly to an improvement in the belt structure of the heavy duty pneumatic radial tire.

The radial tire of this type has a casing reinforcement comprising a carcass composed of at least one cord ply containing cords arranged in a substantially radial plane of the tire and a belt composed of at least three rubberized steel cord layers superimposed about the carcass just beneath a tire tread. In such a tire, there is widely used a belt structure, wherein a first belt layer close to the carcass, a second belt layer having a width somewhat wider than that of the first belt layer and a third belt layer having a width substantially equal to that of the first belt layer these layers are superimposed one upon another in such a manner that a cord angle defined as an intersection angle of cord with respect to the mid-circumference of the tire is smaller in the second and third belt layers than in the first belt layer and the cords of these belt layers are crossed with each other with respect to the mid-circumference. However, such tires have a drawback that the cord breaking of the belt inside the tire is apt to be caused by stress concentration based on ruggedness such as stones scattering on road surface, protrusions or the like.

For this end, it has been attempted to mitigate stress by arranging the first belt layer as a pair of belt layer portions separated widthwisely from the mid-circumference of the tire or by a so-called middle removed arrangement. In this attempt, however the reinforcing action of the belt in the middle portion of the tread is weakened, so that the stability of the tread is insufficient and the strain between the second and third belt layers becomes large. This is apt to cause separtion failure at the belt end.

SUMMARY OF THE INVENTION

It is, therefore, an object of the invention to eliminate the aforementioned drawbacks inherent to the conventional belt structure in combination with the radial carcass and to provide a heavy duty pneumatic radial tire which develops high performance by the belt structure giving good tread stability and improved service durability of the belt.

Particularly, the invention is to provide a heavy duty pneumatic radial tire comprising a multilayer belt composed of at least three belt layers and having improved service durability without fear of causing separation failure at the belt end and cord breaking due to ruggedness such as stones scattering on road surface, protrusions or the like.

According to the invention, there is the provision of a heavy duty pneumatic radial tire comprising a carcass composed of at least one cord ply containing cords arranged in a substantially radial plane of the tire and a belt composed of at least three cord layers superimposed about the carcass just beneath a tread, which being called as first belt layer, second belt layer . . . in the order from the carcass;

the cords of said second and third belt layers in the belt being crossed with each other with respect to a mid-circumference of the tire and inclined at an angle of 10°–30° with respect to the mid-circumference;

said first belt layer being disposed as a so-called middle removed arrangement at both side edge portions of the belt separated widthwisely from the mid-circumference and the cords thereof being inclined at an angle of 35°–70° with respect to the mid-circumference in the same direction as the cords of the second belt layer; and between said first and second belt layers being inserted a pair of insert cord plies each having a tensile modulus per unit width in cord direction of $2.0 \times 10^4$–$6.0 \times 10^4$ kgf/cm, the cords of which being crossed with the cords of said first and second belt layers with respect to the mid-circumference and inclined at an angle of 30°–50° with respect to the mid-circumference.

DESCRIPTION OF THE PREFERRED EMBODIMENTS

According to the invention, the insert cord ply is interposed between the first and second belt layers in the conventional middle removed belt structure, which not only contributes to ensure the stability of the tread but also totally reduces the strain produced between the second and third belt layers by dispersing such a strain between the insert cord ply and the first or second belt layer.

The above effects are advantageously achieved by crossing the cords of the insert cord ply with the cords of the first and second belt layers. For this purpose, the cord angle of the insert cord ply is 30°–50° with respect to the mid-circumference. When the cord angle exceeds 50°, the given effect can not be obtained, while when it is less than 30°, the strain becomes excessive between the insert cord ply and the second belt layer, there a problem of transforming the failure nucleus or a fear of causing interlaminar separation between the insert cord ply and the second belt layer without interlaminar separation between the second and third belt layers in the conventional middle removed belt structure so as to develop no given effect.

Further, the insert cord ply is necessary to have a tensile modulus per 1 cm of unit width of $2.0 \times 10^4$–$6.0 \times 10^4$ kgf/cm. When the tensile modulus is less than $2.0 \times 10^4$ kgf/cm, the given effect can not be obtained, while when it exceeds $6.0 \times 10^4$ kgf/cm, the strain becomes excessive between the insert cord ply and the second belt layer, which brings about disadvantages likewise the case that the cord angle is less than 30° as mentioned above.

In order to mitigate the stress concentration acting to the tire casing reinforcement surface ruggedness such as stones the road surface, protrusions or the like, it is necessary that the first belt layer has a middle removed arrangement and a cord angle of 35°–70° and each of the second and third belt layers has a cord angle of 10°–30°, and the cords of the first belt layer are inclined in the same direction as the cords of the second belt layer and the cords of the second and third belt layers are crossed with each other with respect to the mid-circumference as in the prior art.

Figure 1:
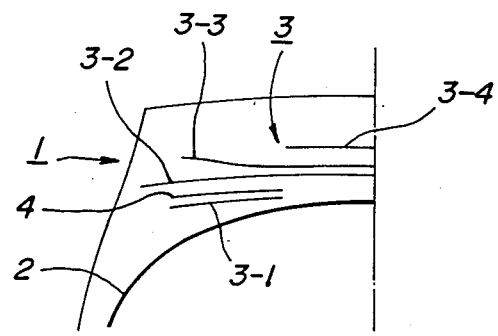
FIG. 1 is a schematically sectional view of a main part of an embodiment of the heavy duty pneumatic radial tire according to the invention.
Figure 2A:
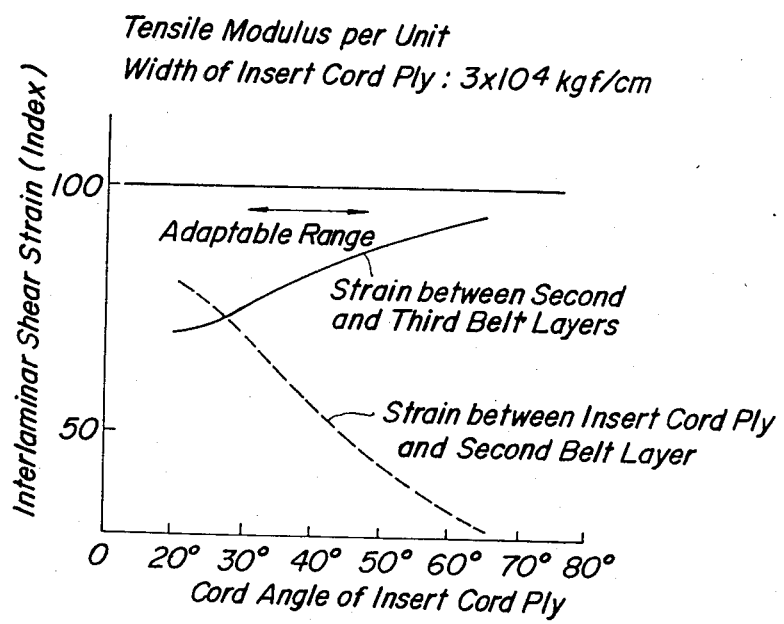
FIGS. 2a and 2b are graphs showing influences of cord angle and tensile modulus per unit width in the insert cord ply on interlaminar shear strain, respectively.
Figure 2B:
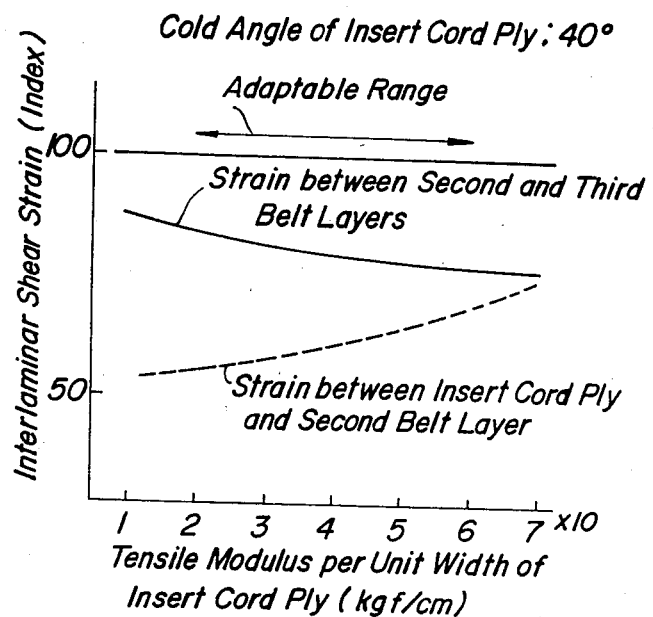

The inventors have made experiments with respect to the middle removed belt structure as shown in FIG. 1 using insert cord plies having a tensile modulus per unit width of $3 \times 10^4$ kgf/cm and a variable cord angle or insert cord plies having a cord angle of 40° and a variable tensile modulus. As a result, it has been confirmed that as shown in FIGS. 2a and 2b, the effective disperison of shear strain is produced between the insert cord ply and the second belt layer or between the second and third belt layers according to the invention under the representation by an index on a basis that the shear strain between the second and third belt layers in the middle removed belt structure using no insert cord ply is 100.

In FIG. 1 is sectionally shown a main part of a tire 1, wherein numeral 2 is a carcass, numeral 3 a belt, numeral 4 an insert cord ply, and numerals 3-1, 3-2, 3-3 and 3-4 first to fourth belt layers, respectively.

Figure 3A:
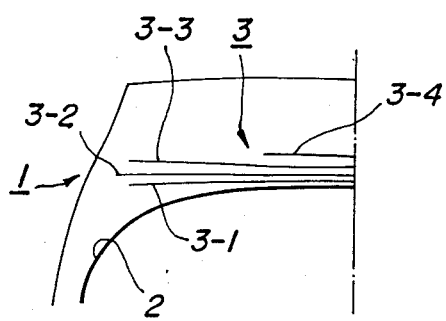
FIGS. 3a and 3b are schematically sectional views of main parts of the conventional tires, respectively.
Figure 3B:
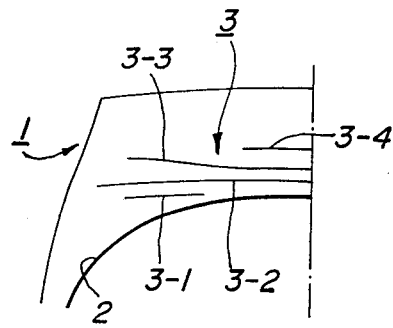
Figure 4A:
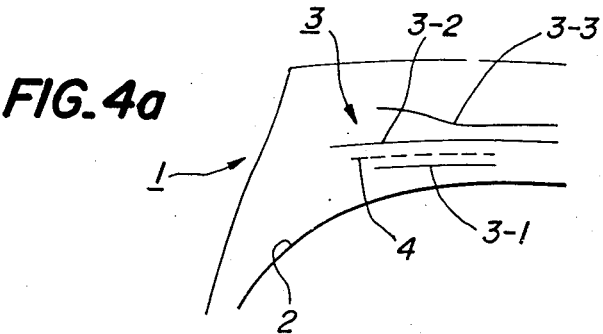
FIGS. 4a and 4d are schematically sectional views of main parts of the other embodiments of the tire according to the invention, respectivly.
Figure 4B:
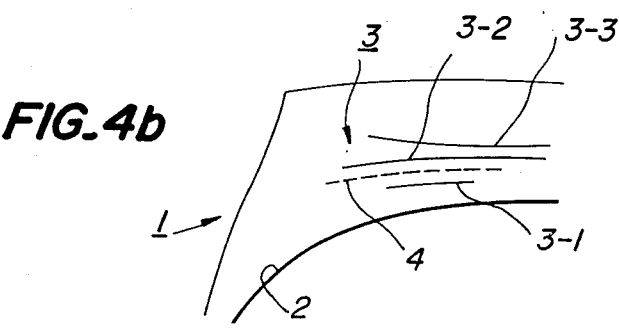
Figure 4C:
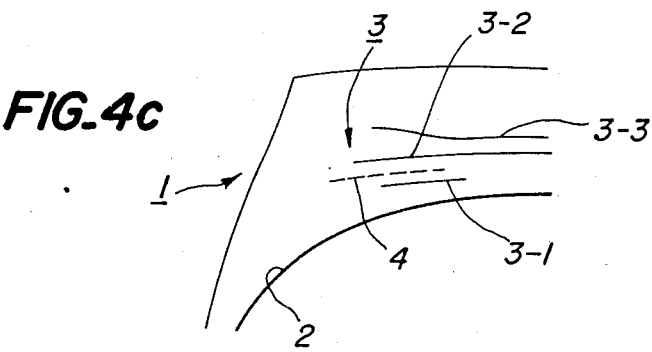
Figure 4D:
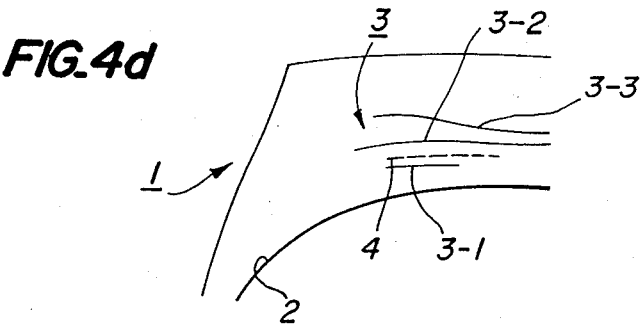

On the contrary, FIGS. 3a and 3b show sectionally main parts of the conventional tires having a full belt structure and a middle removed belt structure, respectively.

EXAMPLE

Three tires with a tire size of 10.00 R20 comprising a radial carcass made from steel cords were manufactured by applying a steel cord having a twisting construction of $(1 \times 3) \times 0.2$ mm$\phi$ + $6 \times 0.38$ mm$\phi$ and a tensile modulus per cord of $1.3 \times 10^4$ kgf/cord to a belt structure as shown in FIGS. 1, 3a and 3b, wherein each of the first and fourth belt layers 3-1 and 3-4 had an end count of 4 cords/cm (tensile modulus per unit width: $5.2 \times 10^4$ kgf/cm), each of the second and third belt layers 3-2 and 3-3 had an end count of 5.6 cords/cm (tensile modulus per unit width: $7.28 \times 10^4$ kgf/cm), and the insert cord ply 4 had an end count of 2 cords/cm (tensile modulus per unit width: $2.6 \times 10^4$ kgf/cm).

Concerning angle, the first belt layer 3-1 was 60° upward to the right, the second belt layer 3-2 was 18° upward to the right, each of the third and fourth belt layers 3-3 and 3-4 was 18° upward to the left, and the insert cord ply 4 was 40° upward to the left.

The wear resistance and the crack length between the second and third belt layers after the running over a distance of 50,000 km were evaluated by subjecting each of the above tires to an indoor drum test to obtain results as shown in the following table under a representation by index on a basis that the value of Comparative tire A of FIG. 3a is 100.

|  | Comparative tire A (FIG. 3a) | Comparative tire B (FIG. 3b) | Example tire (FIG. 1) |
| --- | --- | --- | --- |
| Index of wear resistance | 100 | 85 | 105 |
| Index of crack length | 100 | 120 | 85 |

Further, the same test as described above was repeated by changing the arrangement of the insert cord ply 4 to the first belt layer 3-1 as shown in FIGS. 4a to 4d, whereby substantially the same effect was obtained.

According to the invention, the deteriorations of the stability and separtion resistance in the tire tread, which are accompanied with the middle removed belt structure effective for preventing the cord breaking due to the riding on ruggedness such as stones scattering on road surface, protrusions or the like, can be overcome advantageously, whereby the service durability of heavy duty pneumatic radial tires can effectively be improved.

What is claimed is:

1. A heavy duty pneumatic radial tire comprising; a carcass composed of at least one cord ply containing cords arranged in a substantially radial plane of the tire, and a belt structure composed of at least three cord layers superimposed about the carcass and located beneath a tread, said cord layers difining a first belt layer, a second belt layer, and a third belt layer in that order from the carcass;

the cords of said second and third belt layers in the belt being crossed with each other with respect to a mid-circumference of the tire and inclined at an angle of 10°–30° with respect to the mid-circumference;

said first belt layer being comprised of two portions separated widthwisely from the mid-circumference, each of the said portions being arranged at a side edge portion of said belt structure, and the cords of said first belt layer being inclined at an angle of 35°–70° with respect to the mid-circumference and in the same direction as the cords of the second belt layer; and a pair of insert cord plies separated widthwise from said tire mid-circumference and located at both side edge portions of said belt structure, said insert cord plies respectively inserted between said first and second belt layers, said pair of insert cord plies each having a tensile modulus per unit width in cord direction of $2.0 \times 10^4$–$6.0 \times 10^4$ kgf/cm, the cords of which being crossed with the cords of said first and second layers with respect to the mid-circumference and inclined at an angle of 30°–50° with respect to the mid-circumference.

2. The heavy duty pneumatic radial tire according to claim 1, wherein steel cords are used in said belt structure and in said insert cord ply.

3. The heavy duty pneumatic radial tire according to claim 2, wherein said steel cords have the same twisting construction.

4. The heavy duty pneumatic radial tire according to claim 1, wherein said insert cord ply has an end count per cm smaller than that of said second belt layer.

5. The heavy duty pneumatic radial tire according to claim 1, wherein said insert cord ply has an end count per cm smaller than that of said first belt layer.

6. The heavy duty pneumatic radial tire according to claim 1, wherein said insert cord ply has an end count per cm smaller than that of said third belt layer.

7. The heavy duty pneumatic radial tire according to claim 1, wherein said insert cord ply has a tensile modulus per unit width in cord direction lower than that of said second belt layer.

8. The heavy duty pneumatic radial tire according to claim 1, wherein said insert cord ply has a tensile modulus per unit width in cord direction lower than that of said first belt layer.

9. The heavy duty pneumatic radial tire according to claim 1, wherein said insert cord ply has a tensile modulus per unit width in cord direction lower than that of said third belt layer.

* * * * *